UNITED STATES PATENT OFFICE.

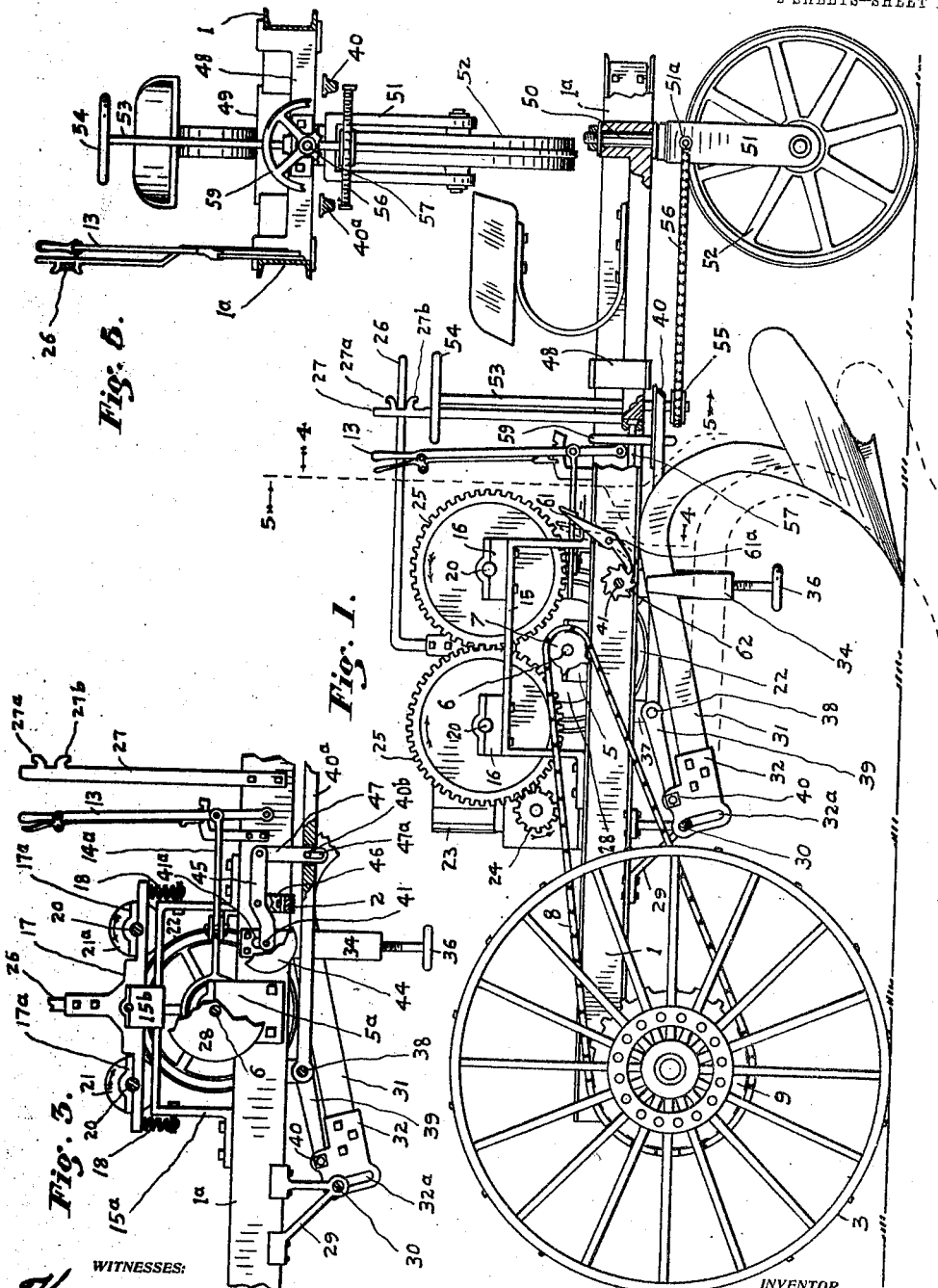

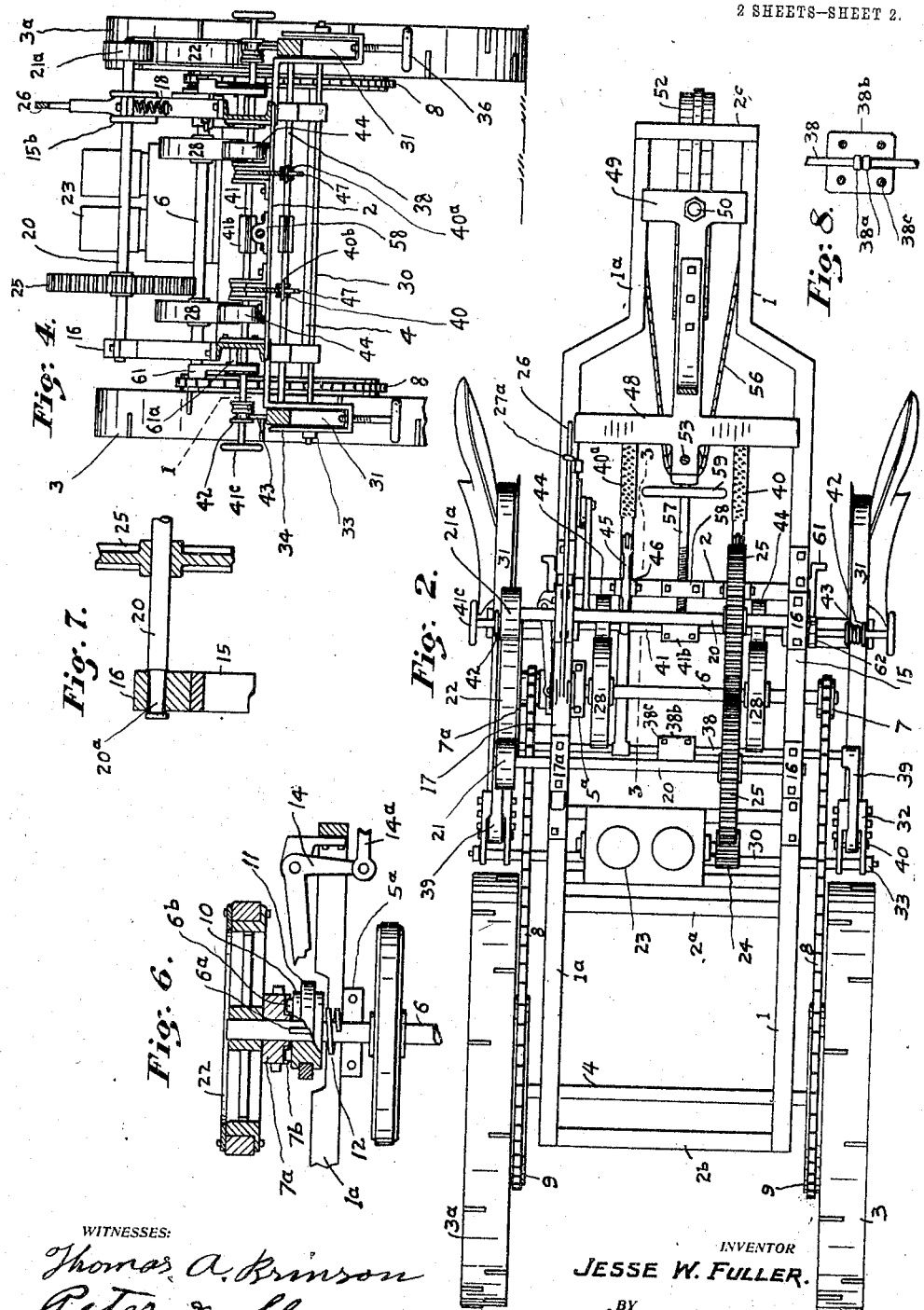

JESSE W. FULLER, OF MUNCIE, INDIANA.

MOTOR-PLOW.

1,029,601.  Specification of Letters Patent.  Patented June 18, 1912.

Application filed September 25, 1911. Serial No. 651,020.

*To all whom it may concern:*

Be it known that I, JESSE W. FULLER, a citizen of the United States, residing at Muncie, in the county of Delaware and State of Indiana, have invented certain new and useful Improvements in Motor-Plows, of which the following is a specification.

This invention relates to motor propelled agricultural implements and has especial reference to that class of implements intended for the plowing or cultivating of the soil.

The machine herein shown and embodying my present invention is built along the lines generally of motor driven plows heretofore devised; that is to say—the machine comprises a vehicle frame mounted on traction wheels, a motor and the connections between same and the traction wheels whereby the vehicle may be propelled.

The objects of this invention are to provide a machine capable of performing all the requirements of a plowing implement in an improved manner; specific purposes of my invention are to provide a transmission and controlling mechanism capable of being operated to transmit the driving power to the traction mechanism and of being made to assist in the handling of the cultivating tools.

Accordingly the invention consists of the new construction, combination and arrangement of parts described in this specification, defined in the appended claims, and illustrated in the accompanying drawings.

In the drawings similar characters of reference are applied to the different parts of the machine as they appear in the several views, in which—

Figure 1 is a side view of my improved motor plow, a portion of the frame member 1 being broken away, and the shaft 41 being broken at the line marked 1 in Fig. 4. Fig. 2 is a plan view of the machine the operator's seat being not shown. Fig. 3 is a longitudinal sectional view taken on the line 3—3 in Fig. 2, portions of the wheels 28 and 44 being broken away. Fig. 4 is a transverse sectional view taken on the dotted line and viewed in the direction indicated by the arrow 4 in Fig. 1. Fig. 5 is a transverse sectional view taken on the dotted line and viewed in the direction indicated by the arrow 5 in Fig. 1. Fig. 6 is a detailed view of the sprocket wheel 7$^a$ and its connections. Fig. 7 is a detail view showing the shaft 20 and its bearing in the boxing 16. Fig. 8 is a detailed view of one of the divided coupling sleeves used to retain the ends of the divided shafts 38 and 41.

The frame of my improved agricultural implement comprises oppositely disposed channel bars 1 and 1$^a$ spaced apart by cross members 2, 2$^a$, 2$^b$ and 2$^c$. The driving wheels 3 and 3$^a$ are journaled on the axle shaft 4 which is secured to the undersides of the frame bars 1 and 1$^a$. Journaled in boxings 5 and 5$^a$ that are carried by the frame is a shaft 6. The motion of the sprocket wheels 7 and 7$^a$ that are carried by this shaft 6 is transmitted by the sprocket chains 8 to the sprocket wheels 9 that are secured to the driving wheels. The sprocket wheel 7 is secured to the shaft 6, and the sprocket wheel 7$^a$ is mounted loosely thereon, as shown in Fig. 6, and has the recesses 7$^b$ in its side. Adjacent to this sprocket wheel 7$^a$ is a sleeve 10 mounted slidingly but held against rotation on the shaft 6 by the feather 6$^a$. 6$^b$ designate lugs on the end of said sleeve adapted to engage the recesses 7$^b$. In a peripheral groove in this sleeve is loosely retained the ring 11. A spring 12 between said sleeve and the boxing 5$^a$ holds the sleeve normally in locked engagement with the sprocket wheel. By a hand lever 13 which has connection with the ring 11 by a connecting rod 14$^a$ and a suitable bell crank 14 the sleeve 10 may be disengaged from the said sprocket wheel 7$^a$ permitting it to idle on the shaft 6.

Located above and at each side of the axial center of shaft 6 and supported by a truss 15 are boxings 16. On the truss 15$^a$ (see Fig. 3) is supported centrally a bearing block 15$^b$. Trunnioned on this bearing block is a beam 17 of such length that boxings 17$^a$ provided at its ends are opposite the boxings 16. The beam 17 is held normally at horizontal position by springs 18 of similar tension disposed underneath the ends of the beam and connected to the truss 15$^a$. On the shafts 20 and 20 whose ends are journaled in the boxings 16 and 17$^a$ are secured friction wheels 21 and 21$^a$ of such diameter that with the beam in the horizontal position there is suitable clearance between them and the larger friction wheel 22 that is secured on the shaft 6.

The internal combustion engine 23 which constitutes the motive power of the machine is located in advance of the transmission mechanism just described; by a pinion 24 that meshes with one of the intermeshing gear wheels 25 secured to the shafts 20 motion is imparted to the said shafts and they are rotated in opposite directions. The direction of movement for the engine shaft is indicated by the arrow in Fig. 1. By this combination and arrangement of parts operation of the motor gives continuous rotation (in opposite directions) of the friction wheels 21 and 21ª and the mechanism also acts as a balancing element for the motor. By a hand lever 26 which is secured to a central arm of the beam 17 and whose free end is retained at raised or lowered positions by lugs 27ª and 27ᵇ respectively on the keeper bar 27, the operator may manipulate the beam 17 so that one or the other of the shafts 20 bearing the friction wheels 21 and 21ª may be lowered from the neutral position shown, and so held that there is frictional contact of one or the other of said friction wheels with the friction wheel 22. The journals 20ª of the shafts 20 and which have their bearing in the boxings 16 are tapered (as shown in Fig. 7) so that easy running of the said shafts is not interfered with when the shaft ends bearing in the boxings 17ª are raised or lowered.

28 and 28 designate friction wheels secured on the shaft 6. The several parts now to be described and that are arranged and combined with the foregoing elements render possible the utilizing of the motive power of the machine for the performance of functions in the manipulating of the tools carried by the machine. Supported below the vehicle frame by braces 29 is a transversely disposed draw bar 30 upon whose ends are connected the heads of the plow beams 31. Bolted to the end of each of the plow beams is the head 32; this head has a slot 32ª which engages loosely the end of the draw bar and is retained in place by a suitable nut. These plow beams are supported at proper height by the means hereinafter described and are held against transverse vibration in guideways formed by the stirrups 34 carried by the frame. The height at which the plow beams are to be carried may be varied by the adjustment screws 36.

Carried loosely in bearings 37 is a shaft 38; arms 39 secured thereto have their ends connected by bolts 40 loosely to the heads 32. This shaft 38 is divided, the proximate ends thereof provided with the heads 38ª (see Fig. 8) are held in place by a divided sleeve 38ᵇ. The meeting faces of the two parts composing this sleeve are provided with half bores in which the shaft ends are held so that when the bolts 38ᶜ are tightened the sleeve will be secured to one of the shaft ends and will be loose on the other. Foot levers 40 and 40ª have their forward ends secured to the left and right portion respectively of the shaft 38. On the ends of a shaft 41 which is carried loosely in vertical oblong holes 41ª in the frame are spools 42 over which are wound cables or chains 43 which connect with the plow beams. This shaft is of divided form the two parts thereof being connected by a sleeve 41ᵇ of construction similar to the sleeve 38ᵇ shown in Fig. 8.

The friction wheels 44 carried by the shaft 41 are of such diameter that while the shaft 41 rests in the bottom of the oblong hole 41ª there is clearance between the wheels 44 and the friction wheels 28. Near these friction wheels 44 are levers 45 trunnioned on the blocks 46 that are carried on the cross member 2. The front ends of these levers have loose connection with the said shaft 41;
links 47 connected loosely to the rear ends of the levers 45 are provided with oblong holes 47ª which holes are engaged by the pins 40ᵇ carried by the foot levers 40 and 40ª. The relative positions of the several parts just described are clearly shown in Fig. 3.

The steering mechanism and the rear support for my improved machine comprise a body member having cross arms 48 and 49 provided with flanges that engage slidingly the edges of the frame members 1 and 1ª. Held rotatively in the cross arm 49 is a head bar 50 of the fork 51. In the ends of this fork are held the ends of the axle bar upon which the guide wheel 52 is journaled. In the cross arm 48 is journaled the upright shaft 53 provided with the wheel 54. Secured on the lower end of this shaft is a sprocket wheel or spool 55 over which a chain or cable 56 extends to the stems 51ª that project from the sides of the fork 51. A screw shaft 57 which turns in a threaded block 58 carried by the member 2 has its rear end connected loosely to the cross arm 48.

59 designates a hand wheel secured to said screw shaft.

This improved machine is intended to meet every requirement necessary in the plowing or breaking of the soil and is especially intended for the use of agriculturalists not requiring or needing the heavier type of plowing machine involving gang plow tools and heavy, expensive and complicated motive power and transmission and controlling devices. One or more plow tools may be used and the machine may be so controlled that the plows may be effectively manipulated and operated without interference with the progress of the vehicle in its travel throughout the length of the row and in its turn from one row to the next row. While the machine is not engaged in the actual work of plowing the plow beams are supported at the raised position shown. To raise and support the plow beam the hand wheel 41° is rotated until the plow beam is raised to the desired height; the pawl 61 which is movable on the stud 61ª carried by the machine frame and which pawl normally occupies the dotted line position shown in Fig. 1, is then moved into engagement with the ratchet wheel 62 secured to the shaft 41 thereby holding it against reverse movement.

Control of the motor 23 is had by usual regulating and throttling devices carried at the steering wheel. Operating the motor in the direction indicated by the arrow on the pinion 24 the friction wheels 21 and 21ª will turn in the directions shown by the arrows marked thereon. Raising the lever 26 will move the beam 17 thereby bringing friction wheel 21 to contact with the friction wheel 22 and rotating the shaft 26 in the direction to give forward movement to the traction wheels 3 and 3ª. For rearward movement of the traction wheels the lever 26 is depressed which raises wheel 21 and depresses wheel 21ª. The speed at which the wheel 22 is rotated is governed by the pressure exerted to increase or decrease the frictional contact between the wheels 22 and 21 or 21ª.

The maximum depth in the soil at which the plow blade is to work, having been determined, the adjustment screw 36 is set accordingly. The pawl 61 is then returned to the dotted line position (disengaged from the ratchet wheel 62); the plow beam being thus released descends to the dotted line position and rests on the head of the adjustment screw. The machine is now ready to proceed with the work of plowing. With the raising then of the lever 26 contact of the friction wheel 21 with the wheel 22 is had; this gives a gradual movement forward of the vehicle. By further raising the lever 26 thereby increasing the contact pressure until there is no slippage between the friction wheels the movement of the vehicle is gradually increased to maximum speed. The lever 26 is then held by the lug 27ª and the operator's attention is given to guiding the vehicle by the wheel 54 and of controlling the operation of the plow tools by the foot levers 40 and 40ª. By pressure on the right or left foot lever 40ª or 40 respectively, the left or right plow beam head 32 may be raised within such range that the point of the plow blade may be inclined properly. If necessary to quickly raise the plows to avoid striking an obstruction such as a rock or stump the foot lever is further depressed; the pin 40ᵇ is thus brought to engage the bottom edge of the hole 47ª in the link 47 the movement then of the lever 45 raises the shaft 41 and causes frictional contact of the wheel 44 with the wheel 28 the latter actuating wheel 44 and the rotation of the spool 42 causing the beam to be raised. With a release by the operator of the foot pressure the friction wheel 44 recedes and the plow beam drops back to operative lower position. It is obvious that either one of the plows or both of them at the same time may be manipulated by the foot-pressure exerted at the foot levers 40 and 40ª. When the end of the row being plowed has been reached the operator in the manner hereinbefore described causes the plows to be raised; the pawl 61 is moved by the operator's hand from the dotted line position to the position engaged with the ratchet wheel 62 thereby preventing reverse movement of the shaft 41. The hand lever 13 is then moved rearwardly which shifts the sleeve 10 out of engagement with the sprocket wheel 7ª thus permitting the sprocket wheel 7ª to idle on its bearing. Turning the vehicle at the end of the plowed row is thus materially facilitated. The frame that supports the guide wheel being capable of adjustment longitudinally of the machine frame the length of the machine may be easily varied to accord to the number of plow tools used it being desirable to increase the length of the wheel base with the increase of the number of plow tools used.

What I claim is:

1. In a cultivating machine comprising a main frame, an axle bar and traction wheels on the axle bar, a motor driven shaft journaled on the frame, a first and second standard carried by the frame, a beam trunnioned on the second standard, countershafts journaled parallel with and at each side of the axial center of the driven shaft, their ends being journaled in boxings carried by the first standard and in the beam trunnioned on the second standard, a friction wheel on the driven shaft, a friction wheel on each of the countershafts of diameter to make contact with the first named friction wheel when the said trunnioned beam is moved, gear wheels secured on the ends of the countershafts and intermeshing with each other, connections between the motor and one of these gear wheels, secondary friction wheels on the driven shaft, a draw bar carried by the frame, guideway stirrups carried by the frame, tool carrier beams carried loosely in said stirrups and having their heads connected loosely to the draw bar, adjustment screws in the stirrups to vary the heights at which the tool carrier bars are carried, a jointed shaft having its ends journaled in bearings carried by the frame, arms secured to the ends of said jointed shaft and having loose connection with the heads of the tool carrier beams, foot levers having their forward ends secured to said jointed shaft, a beam shaft centrally jointed and having its ends carried loosely in oblong holes therefor in the frame, chains wound on the beam shaft and having connection with the tool carrier beams, friction wheels secured to the beam shaft, lift levers fulcrumed on a cross member of the frame and having their forward ends connected to the beam shaft, vertical links connected to the rear ends of said lift levers and having slots in their bottom ends, and pins carried by the foot levers to engage said slots.

2. In a machine of the kind described, the combination of a frame, a motor driven shaft journaled on the frame, a first and second standard carried by the frame, a beam trunnioned on the second standard, countershafts journaled parallel with and at each side of the axial center of the driven shaft, their ends being journaled in boxings carried by the first standard and in the beam trunnioned on the second standard, a friction wheel on the driven shaft, a friction wheel on each of the countershafts of diameter to make contact with the first named friction wheel when the said trunnioned beam is moved, gear wheels secured on the ends of the countershafts and intermeshing with each other, a gear wheel secured on the motor driven shaft and intermeshing with one of the aforesaid gear wheels, a secondary friction wheel on the driven shaft, a draw bar carried by the frame, a guideway stirrup carried by the frame, a tool carrier beam carried loosely in said stirrup and having its head connected loosely to the draw bar, adjustment means in the stirrup to vary the height at which the tool carrier beam is carried, a shaft having its end journaled in bearings carried by the frame, an arm secured to the said shaft and having loose connection with the head of the tool carrier beam, a foot lever having its forward end secured to said shaft, a beam shaft having its ends carried loosely in oblong holes therefor in the frame, a chain wound on the beam shaft and having connection with the tool carrier beam, a friction wheel secured to the beam shaft, a lift lever fulcrumed on a cross member of the frame and having its forward end connected to the beam shaft, a vertical link connected to the rear end of the lift lever and having a slot therein, and a pin carried by the foot lever to engage said slot.

3. In a machine of the kind described, the combination of a driven shaft carried by the frame, a friction wheel secured on the said shaft, a draw bar carried by the frame, a guideway stirrup carried by the frame, a tool carrier beam carried loosely in the said stirrup and having its head connected loosely to the draw bar, a shaft having its ends journaled in bearings carried by the frame, an arm secured to the said shaft and having loose connection with the head of the tool carrier beam, a foot lever having its forward end secured to the said shaft, a beam shaft having its ends carried in oblong holes therefor in the frame, a chain wound on the beam shaft and having connection with the tool carrier beam, a friction wheel secured to the beam shaft, devices operable by the foot lever to raise the beam shaft, a toothed wheel secured to the beam shaft, and a pawl carried by the frame capable of being moved into and out of coöperative engagement with the said toothed wheel.

4. In a machine of the kind described, a frame, a draw bar carried by the frame, a tool carrier beam, a head on the tool carrier beam provided with a slot to engage loosely the said draw bar, a shaft having its ends journaled in bearings carried by the frame, an arm secured to the said shaft and having loose connection with the head of the tool carrier beam, a foot lever having its end secured to said shaft, a beam shaft having its ends carried loosely by the frame, devices operable by the foot lever to raise the beam shaft, a chain wound on the beam shaft and having connection with the tool carrier beam, a hand wheel secured on the beam shaft, a toothed wheel secured on the beam shaft, and a pawl carried by the frame capable of being moved into and out of coöperative engagement with the toothed wheel.

5. In a machine of the kind described, a frame, a driven shaft, tool carrier beams supported by the frame, friction wheels secured to the driven shaft, a beam shaft disposed above the tool carrier beams and divided centrally and having its outer end portions carried loosely by the vehicle frame, a coupling member to hold loosely the proximate ends of the sections of said beam shaft, friction wheels secured to the beam shaft, flexible members wound on the beam shaft and having connections with the tool carrier beams, and means for shifting the beam shaft to cause contact of its wheels with the wheels of the driven shaft whereby the beam shaft is rotated and the tool carrier beams are thereby raised.

6. In a machine of the kind described, a frame, a driven shaft, tool carrier beams supported by the frame, friction wheels secured to the driven shaft, a beam shaft disposed above the tool carrier beams divided centrally and having its outer end portions carried loosely by the vehicle frame, a coupling member to hold loosely the proximate ends of the sections of the beam shaft, friction wheels secured to the beam shaft, flexible members wound on the beam shaft and having connections with the tool carrier beams, means for shifting the beam shaft to cause contact of its wheels with the wheels of the driven shaft whereby the beam shaft is rotated and the tool carrier beams are thereby raised, and hand operable means carried by the frame to hold the beam shaft against rotation at the raised position when the said friction wheels are out of contact.

In testimony whereof I affix my signature in presence of two witnesses.

JESSE W. FULLER.

Witnesses:
 THOMAS L. RYAN,
 PETER J. SLANE.